United States Patent [19]

Bauer

[11] 4,203,878

[45] May 20, 1980

[54] EPOXY RESIN TRAFFIC PAINT COMPOSITIONS

[75] Inventor: Ronald S. Bauer, Houston, Tex.

[73] Assignee: Shell Oil Company, Houston, Tex.

[21] Appl. No.: 930,482

[22] Filed: Aug. 2, 1978

[51] Int. Cl.² ............................ C09D 3/58; C09D 3/76
[52] U.S. Cl. ............................ 260/18 EP; 260/998.19; 404/12; 404/13; 404/14; 404/94; 427/136; 427/137
[58] Field of Search ............ 260/18 EP, 998.19; 427/136, 137; 404/94, 12, 13, 14

[56] References Cited

U.S. PATENT DOCUMENTS

| | | | |
|---|---|---|---|
| 2,633,458 | 3/1953 | Shokal | 260/18 EP |
| 3,193,519 | 7/1965 | Gessler et al. | 260/998.19 |
| 3,334,555 | 8/1967 | Nagin et al. | 427/136 |
| 3,336,241 | 8/1967 | Shokal | 260/18 EP |
| 3,356,624 | 12/1967 | Neal et al. | 260/18 EP |
| 3,408,219 | 10/1968 | Neal et al. | 260/18 EP |
| 3,446,762 | 5/1969 | Lopez et al. | 260/18 EP |
| 3,480,577 | 11/1969 | Hallstrom et al. | 260/23 EP |
| 3,706,684 | 12/1972 | Lopez | 260/18 EP |
| 4,031,048 | 6/1977 | Holmen et al. | 427/137 |
| 4,082,587 | 4/1978 | Eigenmann | 404/94 |

FOREIGN PATENT DOCUMENTS

2208027  6/1974  France .................................. 427/136

*Primary Examiner*—Ronald W. Griffin
*Attorney, Agent, or Firm*—Norris E. Faringer

[57] ABSTRACT

Rapid-drying, one-package, epoxy traffic paint composition comprises (1) an adduct of an epoxy resin and a polymerized fatty acid, (2) a thermoplastic resin and (3) one or more pigments.

11 Claims, No Drawings

EPOXY RESIN TRAFFIC PAINT COMPOSITIONS

BACKGROUND OF THE INVENTION

Traffic marking compositions containing epoxy resins and/or adducts of epoxy resins with polymeric fatty acids are well-known. See, for example, U.S. Pat. Nos. 3,408,219, 3,446,762, 3,480,577, 3,356,624 and 3,706,684.

While these epoxy-based traffic paints are superior to the traffic paints containing drying oil resins, i.e., alkyd resins and the like, they contain objectionable solvents. In other words, although the traffic working materials described in the above patents have outstanding durability, their use has been limited because of their drying times.

It has now been discovered that when the organic solvents are replaced with selected solid hydrocarbon resins, the drying time is significantly reduced while maintaining the excellent durability characteristics.

SUMMARY OF THE INVENTION

The present invention provides an improved traffic marking composition comprising (1) an adduct of (a) at least one epoxy resin and (b) a polymeric fatty acid, (2) a thermoplastic resin and (3) one or more pigments. The present invention further provides an improved process for applying said traffic paint compositions to traffic surfaces.

Simply, the present compositions are prepared by mixing the pre-formed binder (e.g., epoxy/dimer acid adduct) with the solid hydrocarbon resin at a temperature from about 150° C. to 250° C. and then, while still hot, adding the selected filters, pigments, etc. The coating is then subsequently applied to the traffic surface by "remelting" the pigmented mixture usually at a temperature from about 175° C. to 200° C. and extruding the melted composition onto said surface. Upon quick drying or setting, the resulting marking is extremely durable.

It will be appreciated that the present compositions offer several distinct commercial advantages. Firstly, no epoxy curing agent is required. Secondly, no organic solvent is required. Thirdly, the pot life of the composition is excellent since the cooled composition can be conveniently stored as a solid or near solid resin which can be used simply by melting and extruding by suitable means onto the surface.

DESCRIPTION OF THE PREFERRED EMBODIMENT

The essential feature of the present invention is the elimination of organic solvents. As noted hereinbefore, when the organic solvents are essentially replaced in conventional epoxy/dimeric acid-based traffic paints with certain solid hydrocarbon materials such as thermoplastic resins, the resulting traffic paints dry faster to produce surface markings having outstanding durability.

EPOXY-POLYMERIC FATTY ACID CONDENSATE

Any of the epoxy-polymeric fatty acid condensates or adducts currently employed as traffic paint binders are suitable in the present compositions. Examples of very suitable such epoxy-dimeric acid condensates are disclosed and claimed in U.S. Pat. Nos. 3,408,219, 3,446,762, 3,480,577, 3,356,624 and 3,706,684, among others. Accordingly, so much of these patent disclosures relevant to the preparation of epoxy-dimer fatty acid adducts is herein incorporated by reference.

Simply, an epoxy compound is reacted with a polymeric fatty acid in the presence of a suitable esterification catalyst at temperatures from about 50° C. to about 150° C.

Epoxy Compounds

The epoxy compounds which may be used are those possessing at least one, 1,2-epoxide group, i.e., a

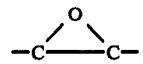

group. They may be monoepoxides or polyepoxides. The monoepoxides may be aliphatic or cycloaliphatic or heterocyclic and may be saturated or unsaturated. They may also be substituted with aromatic rings, ether groups, halogen atoms, ester groups, and the like. Examples of the monoepoxides include, among others, styrene oxide, phenyl glydicyl ether, allyl glydicyl ether, octadecyl glycidyl ether, amyl glycidyl ether, chlorophenyl glycidyl ether, naphthyl glycidyl ether, 1,2-hexylene oxide, ethylene oxide, propylene oxide, 1-heptylene oxide, 3-ethyl-1,2-pentylene oxide, glycidyl acetate, glycidyl benzoate, glycidyl propionate, glycidyl acrylate, glycidyl allyl phthalate, glycidyl methyl maleate, glycidyl stearate, glycidyl oleate, methyl 1,2-epoxy propionate, butyl 1,2-epoxy propionate, and the like.

The polyepoxides used in the process of the invention comprise those compounds possessing more than one 1,2-epoxide group. These polyepoxides may be saturated or unsaturated, aliphatic, cycloaliphatic, aromatic or heterocyclic and may be substituted if desired with non-interfering substituents, such as halogen atoms, phosphorus atoms, hydroxyl groups, ether radicals, and the like. They may also be monomeric or polymeric.

For clarity, many of the polyepoxides and particularly those of the polymeric type are described in terms of epoxy equivalent values. The meaning of this expression is described in U.S. Pat. No. 3,633,458. The polyepoxides used in the present process are those having an epoxy equivalency greater than 1.0.

Various examples of polyepoxides that may be used in the invention are given in U.S. Pat. No. 2,633,458 and it is to be understood that so much of the disclosure of that patent relative to examples of polyepoxides is incorporated by reference into this specification.

Other suitable polyepoxides, including ethers and esters are disclosed in U.S. Pat. No. 3,738,862, and so much of the disclosure of that patent relevant to examples of epoxy compounds is incorporated by reference into this specification.

Other suitable polyepoxides are disclosed in U.S. Pat. Nos. 3,356,624, 3,408,219, and 3,446,762 and so much of the disclosure relevant to examples of epoxy compounds is incorporated by reference into this specification.

Other suitable epoxy compounds include those compounds derived from polyhydric phenols and having at least one vicinal epoxy group wherein the carbon-to-carbon bonds within the six-membered ring are saturated. Such epoxy resins may be obtained by at least two well-known techniques, i.e., by the hydrogenation of glycidyl polyethers of polyhydric phenols or (2) by the reaction of hydrogenated polyhydric phenols with epichlohydrin in the presence of a suitable catalyst such as Lewis acids, i.e., boron trihalides and complexes thereof, and subsequent dehydrochlorination in an alkaline medium. The method of preparation forms no part of the present invention and the resulting saturated epoxy resins derived by either method are suitable in the present compositions.

Briefly, the first method comprises the hydrogenation of glycidyl polyethers of polyhydric phenols with hydrogen in the presence of a catalyst consisting of rhodium and/or ruthenium supported on an inert carrier at a temperature below about 50° C. This method is thoroughly disclosed and described in U.S. Pat. No. 3,336,241, issued Aug. 15, 1967.

The hydrogenated epoxy compounds prepared by the process disclosed in U.S. Pat. No. 3,336,241 are suitable for use in the present compositions. Accordingly, the relevant disclosure of U.S. Pat. No. 3,336,241 is incorporated herein by reference.

The second method comprises the condensation of a hydrogenated polyphenol with an epihalohydrin, such as epichlorohydrin, in the presence of a suitable catalyst such as $BF_3$, followed by dehydrohalogenation in the presence of caustic. When the phenol is Bisphenol A, the resulting saturated epoxy compound is sometimes referred to as "diepoxidized hydrogenated Bisphenol A," or more properly as the diglycidyl ether of 2,2-bis(4-cyclohexanol) propane.

In any event, the term "saturated epoxy resin," as used herein shall be deemed to mean the glycidyl ethers of polyhydric phenols wherein the aromatic ring structure of the phenols have been or are saturated.

An idealized structural formula representing the preferred saturated epoxy compounds is as follows:

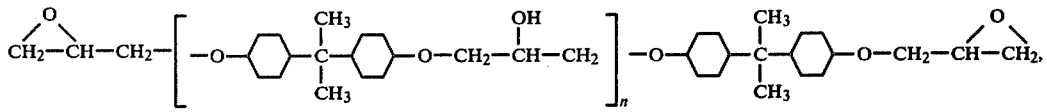

wherein n has a value so that the average molecular weight of the saturated polyepoxide is from about 350 to about 3000.

Preferred saturated epoxy resins are the hydrogenated resins prepared by the process described in U.S. Pat. No. 3,336,241. More preferred are the hydrogenated glycidyl ethers of 2,2-bis(4-hydroxyphenyl)propane, sometimes called the diglycidyl ethers of 2,2-bis(4-cyclohexanol)propane.

Polymeric Fatty Acids

The polymerized unsaturated and saturated long chain fatty acids suitable for use in the present invention are those obtained by polymerizing unsaturated long chain acids under known conditions such as heat, peroxides and the like. These unsaturated polymeric acids may be subsequently saturated by conventional hydrogenation techniques.

The dimer acids comprise acids obtained by polymerizing unsaturated animal and vegetable fatty acids, such as soya bean oil fatty acids, tallow oil acids, and the like. Particularly preferred are the dimerized acids obtained from the ethylenically unsaturated fatty acids or mixtures thereof derived from semi-drying and drying oils, and particularly the conjugated fatty acids containing at least 12 and generally from about 12 to about 20 carbon atoms, such as 9,11-octadecadienoic acid and other acids within the generic formula

wherein R is a $-R_2COOH$ radical, $R_1$ is either a $-R_2COOH$ group or an alkyl radical and $R_2$ is an alkyl radical. These acids polymerize to form dimer acids of the general formula

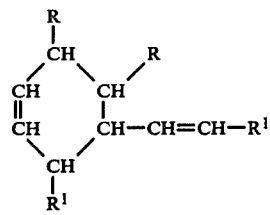

Other suitable dimer acids include those obtained from linoleic acid, linolenic acid, eleosteric acid, and ricinoleic acid. Still another group of dimers are those obtained from dibasic acids such as 8,12-eicosadiene-1,20-dioic acid, 8-vinyl-10-octadecene-1,18-dioic acid, 7,11-octadecadiene-1,18-dioic acid, and the like. As noted hereinbefore, dimer and trimer acids are available commercially sold under various tradenames. A suitable such acid includes Empol 1014, a viscous aliphatic polybasic acid produced by the polymerization of unsaturated fatty acids at mid-molecule and containing 1% $C_{18}$ monobasic fatty acid, 95% $C_{36}$ dibasic fatty acid, and 4% $C_{54}$ tribasic fatty acid, acid value 188-193, saponification value 194-198 and neutralization equivalent 292-298.

Another very suitable dimer acid is marketed as Empol 1016 (dimer acid of less than 1% monobasic acid; neutralization equivalent 284-295; acid value 190-198; and saponification value 194-200).

Particularly preferred are the trimerized acids obtained from the ethylenically unsaturated fatty acids as derived from semi-drying and drying oils, and particularly, the conjugated fatty acids containing from 12 to 20 carbon atoms. The generic structure of the resulting trimerized acids is believed to be that of the following:

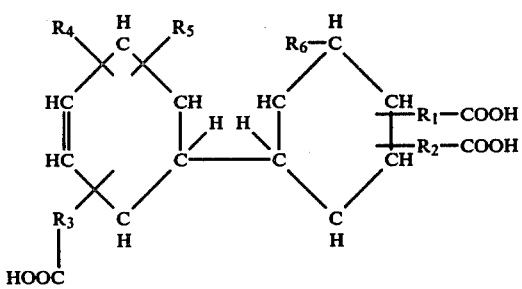

In the above formula, $R_1$, $R_2$ and $R_3$ constitute alkylene radicals having between 4 and 10 carbon atoms each, while $R_4$, $R_5$ and $R_6$ are alkyl radicals having between 4 and 10 carbon atoms each. Normally, the products will have the generic formula as follows:

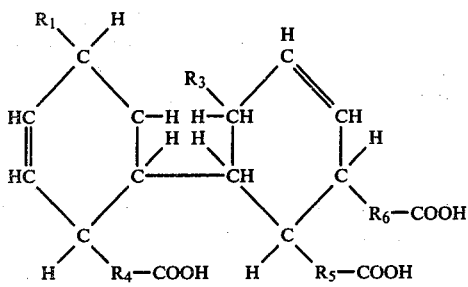

Particularly preferred are the $C_{36}$ dimerized fatty acids.

Other disclosures of suitable polymeric fatty acids can be found in U.S. Pat. Nos. 3,356,624, 3,408,219 and 3,446,762.

Esterification Catalysts

The present condensation reaction is preferably performed in the presence of a suitable exterification catalyst.

In general, any well-known esterification catalyst may be employed. Very suitable such catalysts include the metal hydroxides, such as sodium hydroxide; tin salts such as stannous octoate; phosphines, such as triphenyl phosphine; -onium salts, such as the phosphonium salts, including the phosphonium halides; ammonium salts, etc.

Particularly good catalysts include the phosphonium halides, e.g., ethyl triphenyl phosphonium iodide, and phosphines such as triphenyl phosphine.

In general, the amount of reactants is critical in order to obtain optimum high solids condensates.

It has been found that when the diepoxides and polymeric fatty acids are reacted in the chemical equivalent ratio of dimer acid to epoxy compound from about 0.1:1.0 to 1.0:1.0, suitable adducts are obtained. The most preferred range is from 0.3 to 0.6 chemical equivalents of polymeric fatty acid per chemical equivalent of epoxy compound.

In general, the catalyst, if employed, is utilized in amounts to effect the desired esterification reaction. A suitable range is from about 0.05% to about 3% by weight of reactants.

Temperatures employed in the reaction will generally vary from about 50° C. to about 275° C. In most cases, the acidic component and the polyepoxide will be quite reactive and temperatures of the order of about 50° C. to 200° C. will be sufficient to effect the desired reaction. In other instances, it may be desirable to use higher temperatures, such as those from 125° C. to 275° C. Temperatures of 300° C. or over should generally not be employed.

The reaction is preferably conducted under atmospheric pressure, but it may be advantageous in some cases to employ subatmospheric or superatmospheric pressures.

The reaction may be conducted in the presence or absence of solvents or diluents. In most cases, the acidic component and polyepoxide will be liquid and the reaction may be easily effected without the addition of solvents or diluents. However, in some cases whether either or both reactants are solids or viscous liquids it may be desirable to add diluents to assist in effecting the reaction, such as, for example, inert hydrocarbons as xylene, toluene, cyclohexane, and other materials as cyclohexanone, and the like.

If solvents are employed in the reaction and the formed condensate is to be used for coating compositions, the solvent may be retained with the condensate. Otherwise, the solvent should be removed by any suitable method such as vacuum distillation and the like, if the condensate is not to be utilized for some time after its formation.

The above-described preparation of the epoxy-polymeric fatty acid adducts is presented as typical and modifications described in the above-mentioned patents may likewise be employed.

Particularly preferred condensates are prepared from blends of epoxy resins as described in U.S. Pat. No. 3,706,684.

Thermoplastic Resins

One type of very suitable thermoplastic resins comprise the thermoplastic polymers which are produced by the polymerization of terpene hydrocarbons consisting essentially of beta-pinene and dis-pentene.

Suitable polyterpene resins are marketed under the trade designations of Zonarez ® Polyterpene Resins. Typical basic postulated repeat mer units for these types of polyterpene resins is as follows:

Zonerex "B" type:

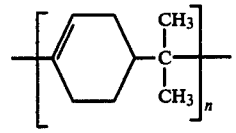

Zonerex "7000" type:

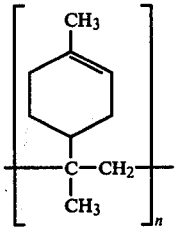

Another suitable type are marketed under the trade designation of Zonester ® Resin Esters, e.g., Zonester ® 55, 75 or 85 resin esters. These esters are glycol derived esters based on disproportionated tall oil resin having the following typical properties:

| | |
|---|---|
| Softening Point, Ring and Ball, °C. | 50-80 |
| Acid number, average | 8 |
| Color, U.S.D.A. Basic Scale | M |

Still another type of thermoplastic resin or polymer include the low molecular weight (300 to 400), light-colored, nonpolar thermoplastic hydrocarbon resins derived from pure styrene monomer. Such resins are liquid, semisolid and medium-softening-paint pure monomer hydrocarbon resins and are marketed under the trade designation of Piccolastic ® A Resins, including A5, A25, A30, A50 and A75. Typical product specifications for these styrene oligomers are as follows:

|  | Piccolastic A Resin | | | | |
| --- | --- | --- | --- | --- | --- |
|  | A5 | A25 | A30 | A50 | A75 |
| Softening point, R&B, °C. (1) | — | 24–27 | 28–32 | 48–52 | 72–77 |
| Color,(1) Gardner, max | 5 | 4 | 3 | 3 | 3 |
| Viscosity:(2) |  |  |  |  |  |
| Stokes at 40° C. | 17–23 | — | — | — | — |
| Acid number, max | 1 | 1 | 1 | 1 | 1 |
| Typical Properties |  |  |  |  |  |
| Softening point, R&B, °C. | 5 | 25 | 30 | 50 | 75 |
| Color, Gardner | 3 | 3 | 3 | 2 | 2 |
| Acid number | 1 | 1 | 1 | 1 | 1 |
| Saponification number | 1 | 1 | 1 | 1 | 1 |
| Ash, % | 0.1 | 0.1 | 0.1 | 0.1 | 0.1 |
| Bromine number | 4.3 | 2.0 | 2.0 | 2.0 | 2.7 |
| Density at 25° C.: |  |  |  |  |  |
| lbs/gal | 8.66 | 8.66 | 8.66 | 8.75 | 8.83 |
| kg/liter | 1.04 | 1.04 | 1.04 | 1.05 | 1.06 |
| Refractive index at 25° C. | 1.57 | 1.58 | 1.58 | 1.58 | 1.60 |
| Flash point, COC: °F. | 370 | 415 | 420 | 465 | 535 |
| °C. | 188 | 213 | 216 | 241 | 280 |
| Viscosity:(2) |  |  |  |  |  |
| Stokes at 40° C. | 20 | — | — | — | — |
| Melt viscosity, °C.: |  |  |  |  |  |
| 1 poise | — | 86 | 90 | 109 | 150 |
| 10 poises | — | 61 | 63 | 85 | 115 |
| 100 poises | — | 47 | 48 | 75 | 95 |

(1)50% resin solids in toluene.
(2)Determined on liquid resin per se.

Other suitable thermoplastic resins include the higher molecular weight polymers marketed under the trade designation of Piccolastic ® D and E series resins (styrene oligomers).

In general, the weight ratio of polymeric acid/epoxy resin adduct (condensate) to thermoplastic resin can be varied widely depending upon many factors, including the properties of the respective components, hot melt temperature, desired viscosity of coating, road surface, etc; however, the ratio of condensate to thermoplastic resin will usually be in the range from about 50:50 to 90:10.

Pigments

The third component of the instant traffic compositions include the pigment. The pigment component usually contains a mixture of pigments and/or fillers. Any of the standard pigments which are used in conventional traffic paints are suitable for use in the instant compositions. Useful pigments include, for example, 100% titanium dioxide; 30% titanium dioxide-70% calcium carbamate and magnesium carbonate; diatomaceous silicas; treated and untreated clays; calcium sulfate; zinc oxide; mica; and magnesium silicate among others.

The concentration of pigment in the paint compositions will vary from about 40 to 60 parts of pigment for one hundred parts of paint, i.e., a pigment to resin ratio of from about 40:60 to 60:40.

The following examples illustrate the preparation of the present paint compositions and their properties and uses. These examples are illustrative examples only and the invention is not to be regarded as limited to any specific conditions or reactants recited therein. Unless otherwise indicated, parts are parts by weight.

Epoxy Resin A is a glycidyl polyether of 2,2-bis(4-hydroxyphenyl) propane having an average molecular weight of about 350 and an epoxy equivalent weight of about 180 containing 0.1 parts per 100 parts of ethyltriphenyl phosphonium iodide.

Epoxy Resin B is a glycidyl polyether of 2,2-bis(4-hydroxyphenyl) propane having an average molecular weight of about 900 and an epoxy equivalent weight of about 450.

EMPOL ® Acid 1016 is a viscous aliphatic polymeric acid produced by the polymerization of unsaturated fatty acids at mid molecule and containing 87% $C_{36}$ dibasic fatty acid; 13% $C_{54}$ tribasic fatty acid; acid value of 190–198; saponification value of 194–200; and a neutralization equivalent of 284–294.

EXAMPLE I

This example illustrates the preparation of the epoxy-dimer acid adduct suitable for use in preparing the instant traffic paint binders.

The following were changed to a three liter kettle equipped with a stirrer, condenser, nitrogen sparge and thermometer:

|  | Grams |
| --- | --- |
| Epoxy Resin A | 579.0 |
| Epoxy Resin B | 164.0 |
| EMPOL ® 1016 Dimer Acid | 775.0 |

The mixture was heated to 250° F. (121° C.) and allowed to exotherm. When the exotherm had exhausted, the mixture was heated to 300° F. (148° C.) until the condensate had an acid value less than 1.0 (measured 0.71). The viscosity of the resulting condensate as a 60.4% by weight solution in toluene was: Gardner-Holdt-$Z_5$+ and 106 Poise (Condensate A).

EXAMPLE II

This example illustrates the hot-melt resin binder containing a thermoplastic resin for preparation of use in the present paint composition.

The following were charged to a two-liter kettle equipped with a stirrer, condenser, nitrogen sparge and thermometer:

|  | Grams |
| --- | --- |
| Epoxy Resin A | 129.5 |
| Epoxy Resin B | 67.5 |
| EMPOL ® 1016 Dimer Acid | 186.0 |

The reactants were heated to 250° F. (121° C.) and allowed to exotherm. When the exotherm had exhausted, the reactants were heated to 300° F. (148° C.) and held until the acid value of the condensate was 0.9. The total time of cook was about 5½ hours. Then 383.4 grams of ZONESTER 55 Resin Ester was added and the mixture heated to 400° F. (204° C.) about 45 minutes. Pigments and other suitable additives can now be added to this resin binder to prepare the instant traffic paint compositions.

EXAMPLE III

This example illustrates the reduction in viscosity of the thermoplastic resin in the epoxy-dimer acid binders.

The epoxy-dimer acid condensate of Example I (Condensate A) was mixed with various thermoplastic resins in varying proportions. The results are tabulated as follows:

| Condensate A | 90 | 80 | 70 | 60 | 50 |
|---|---|---|---|---|---|
| PICCOLASTIC A-50 | 10 | 20 | 30 | 40 | 50 |
| Solution Appearance, RI | Cloudy | Cloudy | Cloudy | Cloudy | Cloudy |
| Viscosity, cps, 350° F. (177° C.) | 4000 | 2500 | 1460 | 850 | 467 |
| Condensate A | 90 | 80 | 70 | 60 | 50 |
| ZONESTER 55 | 10 | 20 | 30 | 40 | 50 |
| Solution Appearance, RI | Clear | Clear | — | Clear | Clear |
| Viscosity, cps, 350° F. (177° C.) | 5293 | 4190 | — | 1060 | 691 |
| Condensate A | 90 | 80 | 70 | 60 | 50 |
| ZONAREZ B-70 | 10 | 20 | 30 | 40 | 50 |
| Solution Appearance, RI | Clear | Cloudy | Cloudy | Cloudy | Cloudy |
| Viscosity, cps, 350° F. (177° C.) | 7375 | 5400 | 4750 | 3415 | 371 |

EXAMPLE IV

This example illustrates the freeze-thaw stability of the instant traffic paint formulation.

Into a one-liter flash equipped with stirrer, nitrogen, sparge and thermometer were placed the following components:

| | Parts by weight |
|---|---|
| Epoxy Resin A | 90 |
| Epoxy Resin B | 26.1 |
| EMPOL Acid 1016 | 115.2 |
| triphenyl phosphine (catalyst) | 0.23 |

The mixture was heated for 1 hour and the resulting condensate had a neat viscosity of 7300 centipoise @ 350° F. (177° C.) and an acid value of 2.0.

A traffic paint formulation was then prepared from the following:

| | Parts by weight |
|---|---|
| Epoxy-acid adduct | 50 |
| PICCOLASTIC A-50 | 50 |
| Glass beads | 80 |
| TiO$_2$ | 48 |
| CaCO$_3$ | 172 |

The resulting traffic paint having a viscosity @ 350° F. (177° C.) of 120 Krebs Units was then evaluated using the following "Freeze-Thaw Test" used at Texas A&M University:

FREEZE-THAW TEST

SCOPE

This test is designed to determine the extent to which materials retain their original properties and bond strength after repeated freezing and thawing.

APPARATUS

1. Concrete blocks
2. Tensile testing apparatus
3. Epoxy glue Epon ® Resin 828 and Epon ® (Curing Agent U.) or its equivalent
4. 2" diameter metal cylinders (3 for each material tested)
5. Large containers of water

PROCEDURE

1. The material is heated and then applied to the concrete block in 2" diameter bond strength patties.
2. After a minimum 24 hour curing time the samples are subjected to a 5 cycle freeze-thaw. This is done by allowing water to freeze up to the tops of the concrete blocks without water contact with the material. Then the samples are placed in a 100° F. environment to thaw.
3. The patties are then pulled and a tensile strength recorded.

REPORTING OF RESULTS

The psi value is recorded along with the material-primer combination of each material tested. The reduction of the force required to break the material bond will be indicative of the loss due to freeze-thaw action. The criterion of minimum bond strength of 180±20 psi will be applied.

The bond strength of the above traffic paint formulation were 435, 338 and 341 psi because of the failure in the concrete.

The freeze-thaw test gave values of 98, 188 and 172 psi. In general, other commercial and experimental thermoplastic materials tested at Texas A&M University produced values generally less than 100 psi.

EXAMPLE V

The traffic paint formulation of Example IV was supplied to a leading manufacturer of traffic paints for evaluation on roadway surfaces. Initial reports have been favorable and indicate that these formulations exhibit improved freeze-thaw resistance, wearability and resistance against abrasion and wear by snow removal equipment. The experimental evaluation is continuing.

What is claimed is:

1. A meltable, extrudable, solventless traffic marking composition free of epoxy curing agent comprising (1) an adduct of (a) at least one glycidyl polyether of polyhydric phenols and (b) a polymeric fatty acid, (2) a thermoplastic resin and (3) one or more pigments.

2. The composition of claim 1 wherein the glycidyl polyether is a glycidyl polyether of 2,2-bis(4-hydroxyphenyl)propane.

3. The composition of claim 1 wherein the polymeric fatty acids comprise acids derived from acids of the general formula R—CH═CH—CH═CH—R$^1$ wherein R is the radical —R$^2$COOH, R$^1$ is selected from R or R$^2$ and R$^2$ is an alkyl group, said acid having from 12 to 20 carbon atoms.

4. The composition of claim 1 wherein the adduct is prepared by reacting the epoxy resins with the polymeric fatty acids in the chemical equivalent ratio of 1.0:0.1 to 1.0 to 1.0.

5. The composition of claim 4 wherein the adduct is prepared in the presence of an esterification catalyst.

6. The composition of claim 5 wherein the esterification catalyst is ethyltriphenyl phosphonium iodide.

7. The composition of claim 1 wherein the weight ratio of adduct to thermoplastic resin is 90:10 to 50:50.

8. The composition of claim 1 wherein the thermoplastic resin is a polymerized terpene hydrocarbon.

9. The composition of claim 1 wherein the thermoplastic resin is a glycol ester of disproportionated tall oil rosin.

10. The composition of claim 1 wherein the thermoplastic resin is a lower molecular weight styrene oligomer.

11. A process for applying traffic marking paints which comprises heating the composition of claim 1 to a temperature from about 175° C. to 200° C., extruding the heated composition onto a surface and allowing the composition to cool.

* * * * *